US010217553B1

(12) United States Patent
Monahan et al.

(10) Patent No.: US 10,217,553 B1
(45) Date of Patent: Feb. 26, 2019

(54) LIQUID CONTAINMENT DEVICE FOR BUSHING IN LIQUID FILLED TRANSFORMER

(71) Applicant: Stock Equipment Company. Inc., Chagrin Falls, OH (US)

(72) Inventors: Randy Monahan, Strongsville, OH (US); Dave Jackson, Newbury, OH (US); Gabor Baranyai, Cuyahoga Falls, OH (US)

(73) Assignee: Stock Equipment Co., Inc., Chagrin Falls, OH (US)

( * ) Notice: Subject to any disclaimer, the term of this patent is extended or adjusted under 35 U.S.C. 154(b) by 1 day.

(21) Appl. No.: 15/782,152

(22) Filed: Oct. 12, 2017

(51) Int. Cl.

| | |
|---|---|
| ***H02G 15/20*** | (2006.01) |
| ***H01F 27/04*** | (2006.01) |
| ***H01F 5/04*** | (2006.01) |
| ***H01F 27/32*** | (2006.01) |
| ***H01F 27/06*** | (2006.01) |
| ***H01F 27/12*** | (2006.01) |

(52) U.S. Cl.
CPC ............... *H01F 5/04* (2013.01); *H01F 27/06* (2013.01); *H01F 27/12* (2013.01); *H01F 27/32* (2013.01); *H01F 27/321* (2013.01)

(58) Field of Classification Search
CPC . H01F 5/04; H01F 27/06; H01F 27/12; H01F 27/32; H01F 27/321; H01F 2005/306; H01F 27/00; H01F 27/02; H02G 3/08; H02G 3/081; H02G 15/20; H02G 15/00; H02G 15/007; H02G 15/02; H02G 15/22; H05K 5/00; H05K 5/02; H01R 13/53; H01R 13/533; H01B 17/34; H01B 17/28; H01B 17/36; H01B 17/301; H01B 17/38; H01B 17/30
USPC ........ 174/11 BH, 12 BH, 14 BH, 15.1, 15.3, 174/17 CT, 17 LF, 137 R, 138 R, 138 F, 174/142, 50, 520, 17 R, 12 R, 135, 152 R, 174/31 R; 361/600, 601, 603, 613, 620, 361/641, 679.01
See application file for complete search history.

(56) References Cited

U.S. PATENT DOCUMENTS

| | | | | |
|---|---|---|---|---|
| 3,801,723 A * | 4/1974 | Kubo | H02G 15/22 | |
| | | | 174/15.3 | |
| 4,401,841 A * | 8/1983 | Meyer | H01B 17/36 | |
| | | | 174/31 R | |
| 4,563,545 A * | 1/1986 | Dzomba | H01B 17/301 | |
| | | | 174/152 R | |

(Continued)

*Primary Examiner* — Angel R Estrada
(74) *Attorney, Agent, or Firm* — Muncy, Geissler, Olds & Lowe, P.C.

(57) ABSTRACT

A liquid containment device is provided for a liquid filled transformer having a tank and a bushing attached to a surface of the tank, the bushing including a terminal having a terminal head including a terminal head opening and a porcelain bushing. A terminal head attachment is attached to the terminal head of the bushing. A housing is provided having an open end, a closed end and a contact pole opening formed on the closed end, the housing encapsulating the bushing and the terminal head attachment. A contact pole is attached to the terminal head attachment and extends through the contact pole opening of the housing. A contact is attached to the contact pole and a housing fastener is fastened on the contact pole to press the housing onto the surface of the tank.

20 Claims, 6 Drawing Sheets

(56) References Cited

U.S. PATENT DOCUMENTS

| | | | | | |
|---|---|---|---|---|---|
| 4,584,429 | A * | 4/1986 | Raketti | H01B 17/28 | 174/142 |
| 4,609,775 | A * | 9/1986 | Moran | H01B 17/34 | 174/152 R |
| 6,271,470 | B1 * | 8/2001 | Geibel | H01B 17/34 | 174/135 |
| 8,633,391 | B2 * | 1/2014 | Strong | F16B 37/14 | 174/137 R |
| 8,759,683 | B2 * | 6/2014 | Ko | H01R 13/53 | 174/137 R |

* cited by examiner

LIQUID CONTAINMENT DEVICE FOR BUSHING IN LIQUID FILLED TRANSFORMER

BACKGROUND OF THE INVENTION

Field of the Invention

The present disclosure relates to a liquid containment device for collecting liquid, such as oil, leaking from a bushing of a liquid filled transformer. The present disclosure also relates to a liquid containment device that encapsulates the bushing to collect the leaked liquid.

Description of the Background Art

A transformer is a device that transfers electrical energy from one voltage to another. It can be dry or liquid filled, and there are millions in use. Examples of the liquid used in the liquid filled transformer include mineral insulating oil, silicon oils, esters, and the like. In the liquid filled transformers, the windings and core are totally immersed in the liquid which functions as the cooling/heat transfer medium and the insulator to control stray voltages.

As shown in FIG. 1, in a liquid filled transformer, such as an oil filled transformer 100, there are a tank 110 that holds liquid (e.g., oil) and a tank cover 120 that covers the tank 110. The tank cover 120 includes a rubber gasket to securely seal the tank 110 from the weather. On the tank cover 120, there may be a smaller inspection cover or the like with a gasket that can be removed to gain access to the tank 110 without removing the tank cover 120. High voltage bushings (also called high voltage terminals) 130, which are high voltage bushings, are attached to the tank cover 120. The high voltage bushings 130 are attached to the high voltage side of the transformer 100. The high voltage bushings 130 can be in single or double bushing depending on the application of the transformer 100. The basic construction of the high voltage bushing 130 is typically made up of conducting terminals and ceramic insulator.

Low voltage bushings (also called low voltage terminals) 140 are used for connecting cables outside of a transformer tank to the low voltage coil winding leads inside the tank and may be arranged, for example, perpendicular to the body of the transformer 100. The transformer 100 may have, for example, two, three or four low voltage bushings 140 depending on the preference of the user.

Cooling fins 150 serve as a heat dissipation device to reduce the temperature rise of the liquid (e.g., oil) in the tank. For the heat dissipation purpose, the mineral oil helps dissipate heat and also provide electrical insulation.

There may also be a pressure relief device that releases pressure build up in the tank 110 once specified limit is reached.

As shown in FIG. 2, the low voltage bushing 140 typically includes a terminal 141 and a porcelain bushing 142. The terminal 141 includes a terminal head 143 and a terminal core 144 that passes through the porcelain bushing 142. The terminal head 143 and the terminal core 144 are made of a conductive material, such as copper, and may be formed in a single body or jointed to each other by means such as welding or fastener. The terminal core 144 is connected to the low voltage coil winding leads inside the tank 110. A common type of terminal head 143 is generally in a plate shape extending in an x-axis direction as shown in FIG. 2 and has holes 145 arranged in the x-axis direction with a predetermined distance for attaching cables. The number of holes 145 may vary depending on the type and rating of the low voltage bushing 140. For example, there may be two holes 145 as shown in FIG. 2. The terminal head 143 also includes a terminal base 146 that is supported by the porcelain bushing 142. The porcelain bushing 142 is made of a porcelain material and holds the terminal base 146 of the terminal head 143 securely.

The low voltage bushing 140 is attached to the tank 110 by clamping the sidewall between the outer and inner porcelain pieces of the porcelain bushing 142 with a gasket between the outer porcelain piece and the sidewall. There may also be a gasket between the inner porcelain piece and the sidewall to cushion and prevent damage to the inner porcelain piece. The terminal core 144 is threaded with a washer and nut attached on the inside of the tank 110 which is tightened to provide the clamping force on the outer gasket.

However, as the operational time goes by, the liquid tends to leak between the porcelain bushing 142 and the sidewall of the tank 110 and/or between the terminal base 146 of the terminal head 143 and the porcelain bushing 142 due to degradation at the gasket or rust. When such oil leakage occurs, which will most likely occur after 20-30 years, repair technicians first stop the operation of the transformer 1, prepare any necessary spill kits, and then drains the oil in the tank 110. Then they remove the inspection cover and reach inside the tank 110 to access inside the tank 110 and replace the leaking bushing, e.g., the low voltage bushing 140 and/or the gasket between the porcelain bushing 142 and the sidewall of the tank 110 and/or between the terminal base 146 of the terminal head 143 and the porcelain bushing 142. After the replacement of the leaking low voltage bushing 140, they need to refill the tank 110 with oil and pull a vacuum on the tank to remove any air or moisture trapped in the oil. This requires long stoppage time of the transformer 100. As a result, such repair is very costly because of the complication in the replacement of the bushing.

In some transformers, it is not possible to gain access to the inner connections of one or more low voltage bushings due to the distance between the cover and the low voltage bushing or due to internal obstructions that cannot be removed. In this case, a hole must be cut in the tank 110 to gain access to replace the leaking low voltage bushing 140 and/or the gasket between the porcelain bushing 142 and the sidewall of the tank 110 and/or between the terminal base 146 of the terminal head 143 and the porcelain bushing 142. After replacement of the leaking bushing, a metal patch must be welded over the access hole that was cut in the tank. Then the tank 110 needs to be refilled with oil and a vacuum pulled on the tank to remove any air or moisture trapped in the oil. This requires long stoppage time of the transformer 100. As a result, such repair is very costly because of the complication in the replacement of the bushing.

SUMMARY OF THE INVENTION

It is therefore an object of the present invention to provide an oil containment device for collecting liquid (e.g., oil) leaking from a low voltage bushing of a liquid filled transformer.

According to an exemplary embodiment of the present application, a liquid containment device for a liquid filled transformer having a tank and a bushing including a terminal having a terminal head and a porcelain bushing attached to a surface of the tank, includes a terminal head attachment that is attached to the terminal head of the bushing; a housing having an open end, a closed end and a contact pole opening formed on the closed end, the housing encapsulating the bushing and the terminal head attachment; a contact pole attached to the terminal head attachment and extending through the contact pole opening of the housing; a contact attached to the contact pole; and a housing fastener that is fastened on the contact pole to press the housing onto the surface of the tank.

According to another exemplary embodiment of the present application, a liquid containment device for a liquid filled transformer having a tank and a bushing including a terminal having a terminal head and a porcelain bushing attached to a surface of the tank includes a housing having an open end, a closed end and a terminal head opening formed on the closed end, the housing encapsulating the porcelain bushing and a first part of the terminal head of the terminal, a second part of the terminal head penetrating through the terminal head opening of the housing so as to be exposed outside the housing; a housing fastener that is fastened on the second part of the terminal head to press the housing onto the surface of the tank; and a contact attached to the second part of the terminal head.

According to another exemplary embodiment of the present application, a liquid containment device for a liquid filled transformer having a tank and a bushing including a terminal having a terminal head and a porcelain bushing attached to a surface of the tank includes a terminal head attachment having a first end and a second end, the first end being attached to the terminal head of the bushing; a housing having an open end, a closed end and an opening formed on the closed end, the housing encapsulating the bushing and at least a first portion of the terminal head attachment; a contact pole attached to the second end the terminal head attachment; and a contact attached to the contact pole. A second portion of the terminal head attachment or the contact pole penetrates through the opening of the housing so as to be exposed outside the housing. A housing fastener is fastened on an exposed portion of the terminal head attachment or the contact pole to press the housing onto the surface of the tank.

Further scope of applicability of the present invention will become apparent from the detailed description given hereinafter. However, it should be understood that the detailed description and specific examples, while indicating exemplary embodiments of the invention that are combinable, are given by way of illustration only, since various changes and modifications within the spirit and scope of the invention will become apparent to those skilled in the art from this detailed description.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
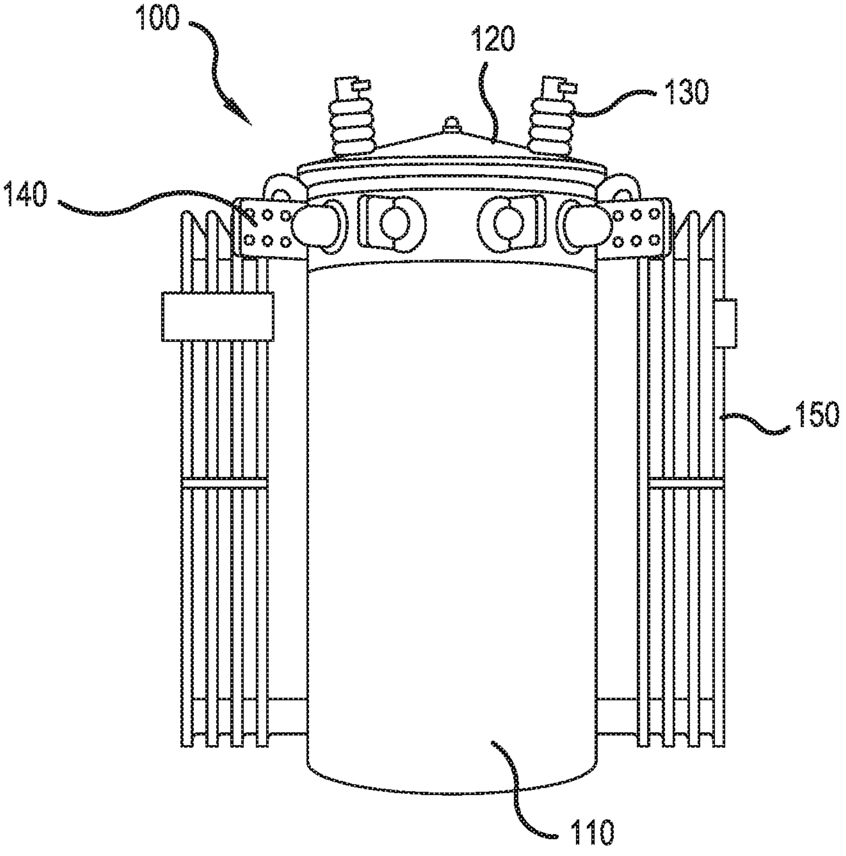
FIG.1 CONVENTIONAL ART
FIG. 1 is a view of a conventional distribution type liquid filled transformer.
Figure 2:
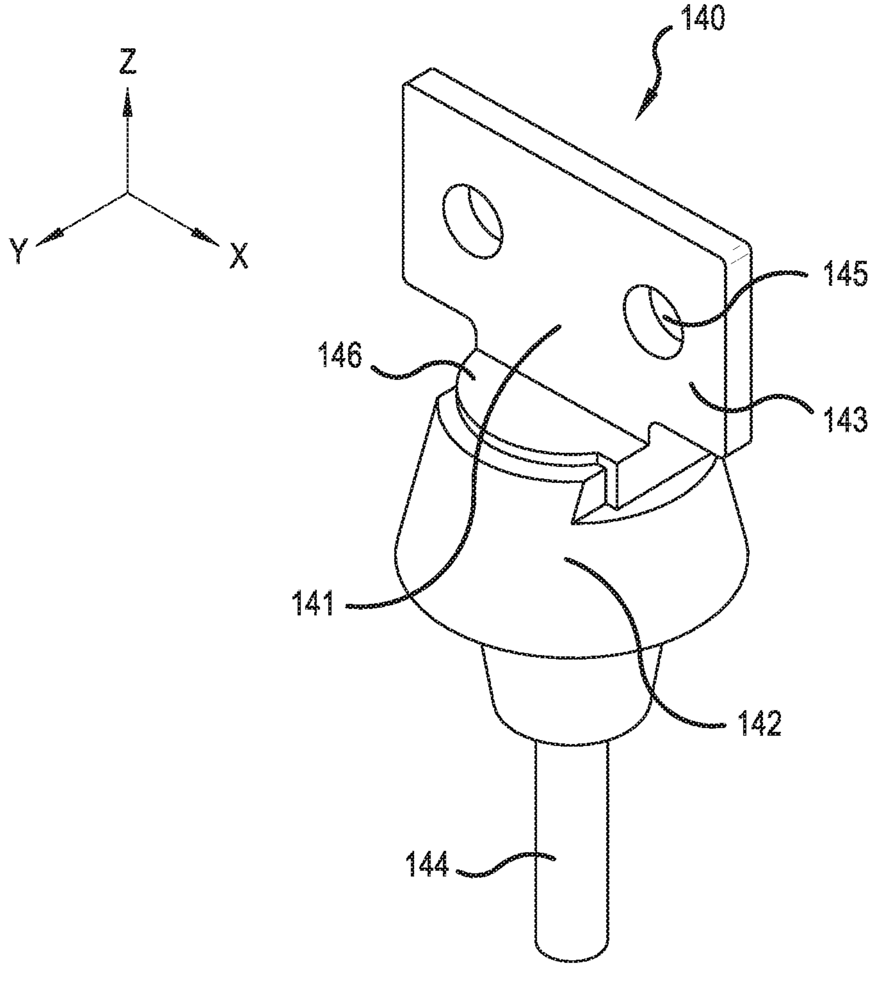
FIG.2 CONVENTIONAL ART
FIG. 2 is a perspective view of a conventional low voltage bushing.
Figure 3:
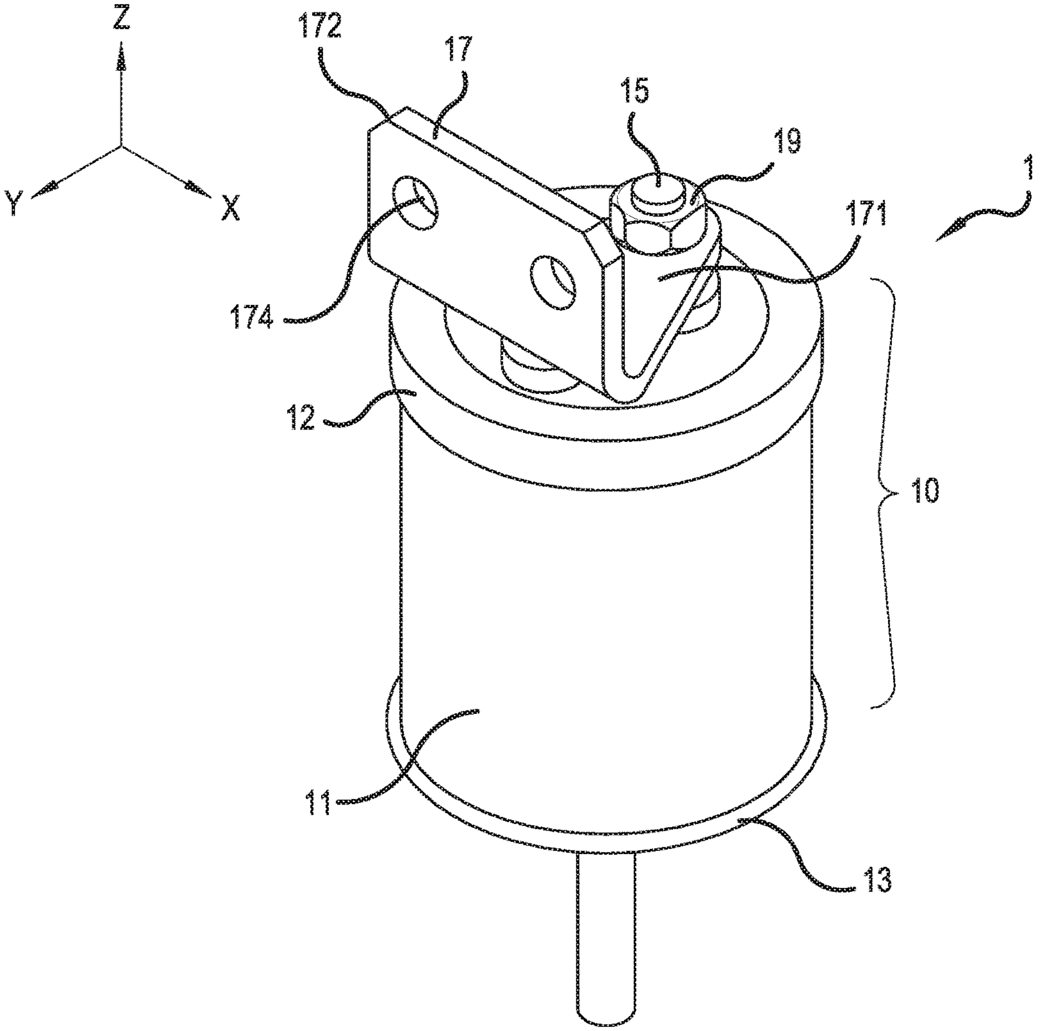
FIG. 3 is perspective view of a liquid containment device according to an exemplary embodiment.
Figure 4:
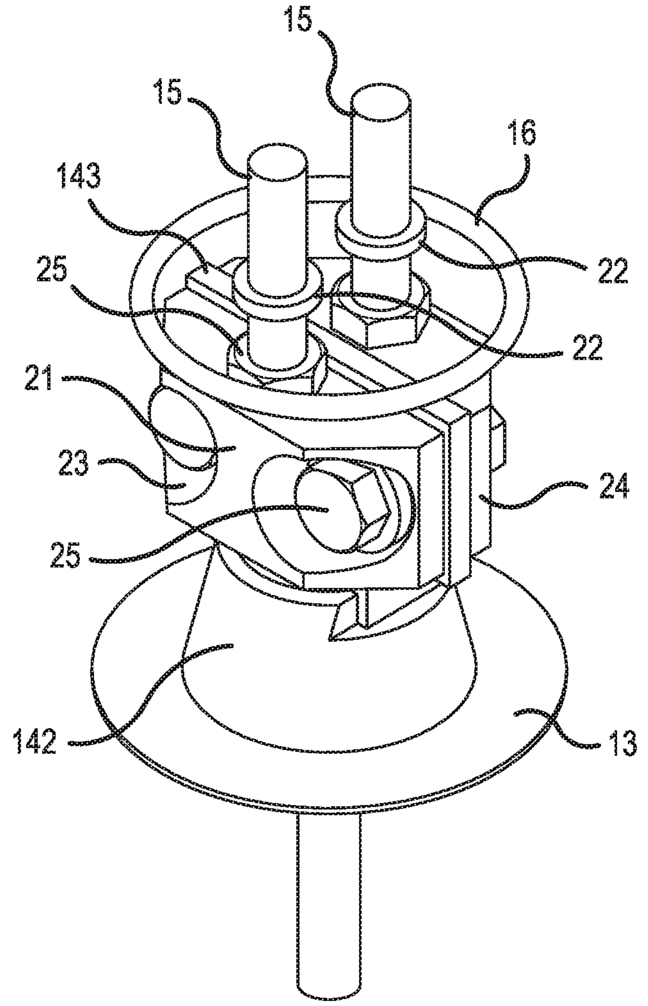
FIG. 4 is an exploded view of the liquid containment device shown in FIG. 3.
Figure 5:
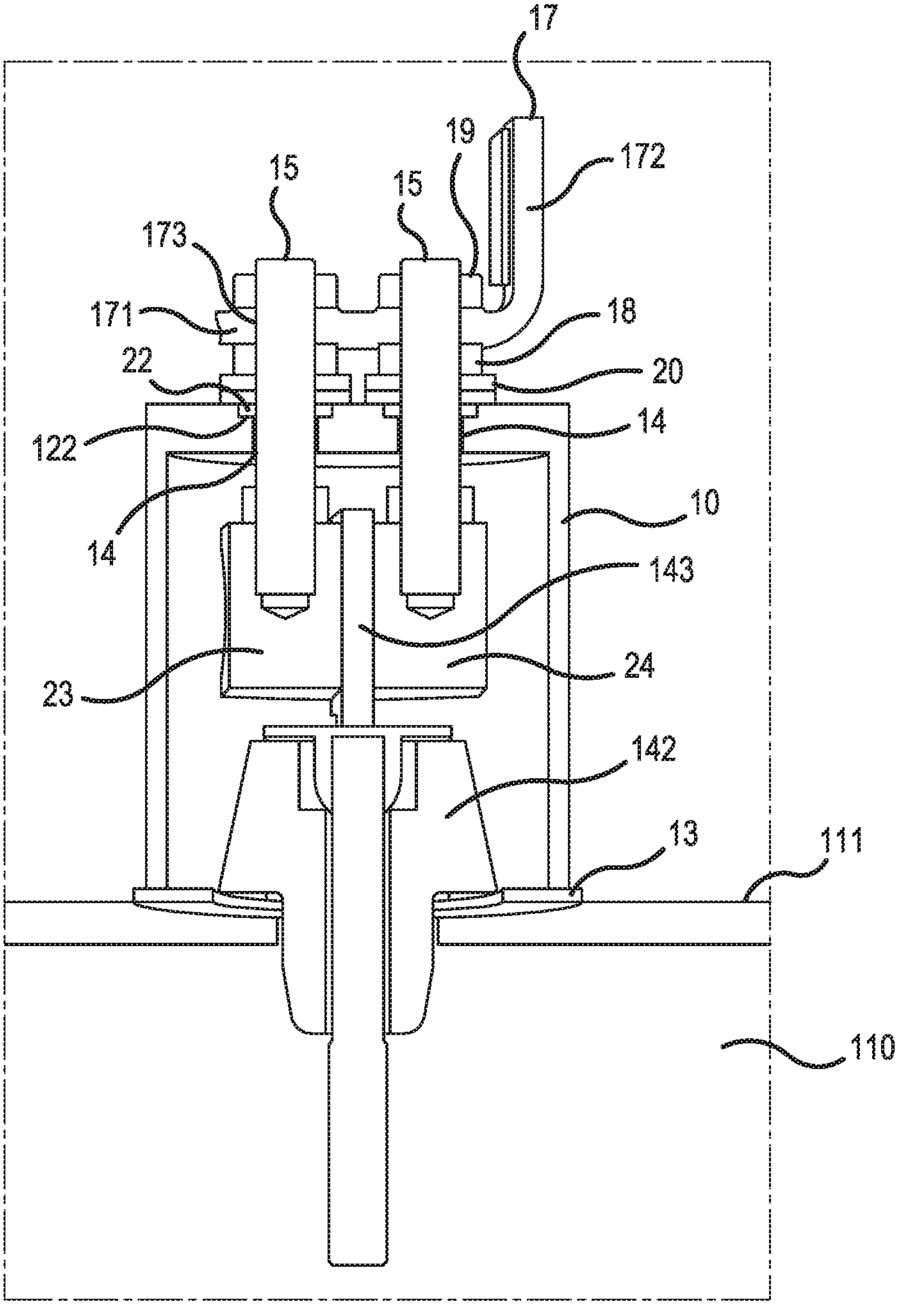
FIG. 5 is a cross-sectional view of the liquid containment device shown in FIG. 3.

FIG. 3 is a perspective view of a liquid containment device (for the purpose of explanation of the present disclosure, hereinafter referred to as "containment device") 1 for collecting leaked liquid, such as oil, according to an exemplary embodiment of the present disclosure, and FIG. 4 is an exploded view of the containment device 1. FIG. 5 is a cross-sectional view of the containment device 1.

The containment device 1 includes a housing 10, which may include a housing body 11 and a top cover 12. The housing body 11 and the top cover 12 may be made in a single piece. The housing body 11 of the housing 10 has a shape, such as a tubular shape, that can surround a bushing, such as the low voltage bushing 140, and has an upper opening closed by the top cover 12 and a lower opening closed by a gasket 13 and the sidewall 111 of the tank 110 of the oil filled transformer 100. A diameter and a length of the housing 10 are large enough to encapsulate the low voltage bushing 140. For example, the diameter of the housing 10 may be approximately 3¾ inches, and the length of the housing 10 may be approximately 4¼ inches. The thickness of the wall of the housing 10 may be approximately $\frac{3}{16}$ inches to provide sufficient strength to the housing 10 to withstand the mounting pressure of the oil containment device 10 on the low voltage bushing 140. The housing body 11 of the housing 10 may be made of ceramic, porcelain, alumina, plastic or the like. Alternatively, the housing 10 may be covered with an insulating coating material, an insulating housing or other materials with insulating properties when the housing 10 is made of a metal. Furthermore, if the sidewall 111 of the tank 110 is curved, an end of the housing that faces the sidewall 111 of the tank 110 may be shaped to accommodate the curvature.

The top cover 12 may have two holes 14 (shown in FIG. 5) formed along a y-axis direction for contact poles 15 to be inserted therethrough in a z-axis direction. The size of each hole 14 on the top cover 12 may be slightly larger than a diameter of the contact pole 15. The top cover 12 covers the upper opening of the housing body 11 and seals the housing body 11 with a rubber O-ring 16. The top cover 12 may also be made of ceramic, porcelain, alumina, plastic or the like.

Alternatively, the housing body 11 and the top cover 12 may be made in a single piece to prevent any leakage between the housing and the top cover 12 and/or to reduce the manufacturing cost. In this case, the O-ring 16 is not necessary.

The gasket 13 may be made of Buna-N (Nitrile Rubber), for example, and is provided between the housing 10 and the sidewall 111 of the tank 110 of the oil filled transformer 100 for sealing the housing 10. The gasket 13 is made in a donut shape having an inner diameter and an outer diameter. The inner diameter of the gasket 13 should be larger than a diameter of the porcelain bushing 142, and the outer diameter of the gasket 13 is larger than a diameter of the housing 10. In addition, the gasket 13 may have a sufficient thickness and/or shape to fill a gap between the lower end of the housing and the sidewall 111 of the tank 110 if the sidewall 111 is curved. This allows to securely seal the housing 10 and to collect the leaked oil inside the containment device 1 by entirely surrounding the porcelain bushing 142.

Above the housing 10, an L-shaped contact 17 is provided. The contact has a first section 171 extending in the y-axis direction in parallel with the top surface of the housing 10 for being fastened on the contact poles 15 and a second section 172 extending in the z-axis for being connected to a cable or the like. The first section 171 has holes 173 that correspond to the holes 14 on the housing 10 through which the contact poles 15 are respectively inserted. The second section 172 is in a plate shape extending in the z-axis direction and may be in the same configuration as the terminal head 143 of the terminal 141. That is, a width, a height and a position of holes 174 are substantially similar to those of the terminal head 143 of the terminal 141. The second section 172 of the contact 17 and the terminal head 143 of the terminal 141 may be parallel with each other. Alternatively, the second section 172 may extend in the y-axis direction so that the second section 172 and the terminal head 143 may be oriented substantially perpendicular to each other. The contact 17 is electrically connected to the terminal head 143 of the low voltage bushing 140 via the contact poles 15 as shown in FIG. 5 and functions as the terminal head 143 when the containment device 1 is installed over the low voltage bushing 140. Also above the housing 10, there are two sets of fasteners 18, 19 that are inserted over the contact poles 15. The first set of fasteners 18 may include a washer(s) 20 that may be integrally formed with the fasteners 18 or may be separately provided. The first set of the fasteners 18 are for securing the housing 10 on the sidewall 111 of the tank 110 of the oil filled transformer 100, and the second set of the fasteners 19 are for fixing the contact 17 on the contact poles 15.

The contact poles 15 pass through the holes 14 on the top cover 12 and are attached to a terminal head attachment 21. Rubber O-rings 22 may be provided between the contact poles 15 and the top cover 12 as discussed below to prevent the oil contained in the housing from leaking. The top cover 12 may be provided with an indentation 122 for placing and positioning the O-rings 22. In addition, the circumferential surface of the contact poles 15 may be threaded for inserting the sets of fasteners 18, 19 for fastening the housing 10 and the contact 17. The attachment of the contact poles 15 to the terminal head attachment 21 may be made by screwing the contact poles 15 into the terminal head attachment 21, connecting the contact poles 15 and the terminal head attachment 21 by fasteners, welding the contact poles 15 to the terminal head attachment 21, attaching them with an electric-conductive adhesive or the like. The terminal head attachment 21 may be provided with openings for inserting the contact poles 15 formed and threaded in advance by drilling or the like.

The terminal head attachment 21 includes a first attachment block 23 and a second attachment block 24 that sandwich the terminal head 143 of the low voltage bushing 140 in the y-axis direction. The first and second terminal blocks 23, 24 have openings that correspond to the holes 145 on the terminal head 143. The fasteners 25 are inserted in the y-axis direction through the holes 145 on the terminal head 143 and the openings on the first and second attachment blocks 23, 24 to securely mount the terminal head attachment 21 and to contact the first and second attachment blocks 23, 24 to the terminal head 143. The first attachment block 23 and the second attachment block 24 have a width and a length that are about the same or smaller than a width and a length of the terminal head 143 of the low voltage bushing 140.

The contact poles 15 and the terminal head attachment 21 are made of an electrically conductive material. For example, the contact poles 15 are made of copper, and the terminal head attachment 21 is made of brass. The contact pole 15 may be made integral to each of the first and second attachment blocks 23, 24.

To install the containment device 1 according to an exemplary embodiment of the present disclosure on a bushing, such as the low voltage bushing 140, the first and second attachment blocks 23, 24 are attached to the terminal head 143 of the low voltage bushing 140 in the y-axis direction and mounted thereon by inserting the fasteners 25 in the y-axis direction into the respective holes 145 on the terminal head 143. The contact poles 15 are attached to the first and second attachment blocks 23, 25 in the z-axis direction by fasteners or the like. The contact poles 15 may be attached to the first and second attachment blocks 23, 24 in advance of the installation.

The gasket 13 is placed on the sidewall 111 of the tank 110 of the liquid filled transformer 100 around the porcelain bushing 142. Then, the housing 10 is placed over the gasket 13 so that the first (bottom) end of the housing 10 is fully in contact with the gasket 13. At this time, the housing 10 surrounds the low voltage bushing 140. If the housing body 11 and the top cover 12 are separately provided, the top cover 12 is then placed on over the second (top) end of the housing 10 with the O-ring 16 therebetween to seal the second end of the housing 10. The housing body 11 and the top cover 12 may be adjoined before the installation. When the housing body 11 and the top cover 12 are made in a single piece, the placement of the O-ring 16 is not necessary. At this time, the contact poles 15 are inserted through the holes 14 on the top end of the housing 10 or the top cover 12.

With the O-rings 22 and washers 20 (if separately provided) being placed over the contact poles 15, the fasteners 18 are fastened through the contact poles 15 and on the top cover 12 so that the housing 10 is pressed against the gasket 13 to seal the first end of the housing 10. Thereafter, the contact 17 is inserted over the contact poles 15 and fastened by the fasteners 19.

According to an exemplary embodiment of the present application, one attachment block with one contact pole 15 is provided for use on a terminal head of a different configuration than terminal head 143. In this case, top cover 12 would have only one hole 14.

Moreover, according to an exemplary embodiment, two sets of fasteners 18, 19 are provided above the housing 11. However, the first set of the fasteners 18 may be omitted, given that the housing 10 is made of an insulating material.

Further, according to an exemplary embodiment, the contact is in an L-shape. However, the shale of the contact is not limited to the L-shape and may be in a U-shape. Also, the contact may be a simple plate.

Yet further, according to an exemplary embodiment, a valve or a plug may be provided on the housing to remove the air and fill the housing 10 with oil to prevent air from entering tank 110.

With the above-described construction according to the present disclosure, the terminal head 143 is electrically connected to the contact 17, while the housing 10 collects the leaked oil and prevents such from contaminating the environment. As a result, the liquid containment device 1 according to the present disclosure provides a long term solution to the liquid leakage without causing a high repair cost or frequent coating of leak-stoppage materials on the bushings.

The Invention is not limited to the embodiment variants illustrated in FIGS. 3 through 5. For example, it is possible to connect the contact poles to the terminal head attachment substantially perpendicularly if the space in the z direction is limited.

In addition, the inventive concept of the present application may be utilized for different configurations of terminal heads. For example, if the terminal head is threaded and of sufficient length, attachment blocks 23 and 24 and contact pole 15 discussed above may be omitted.

Figure 6:
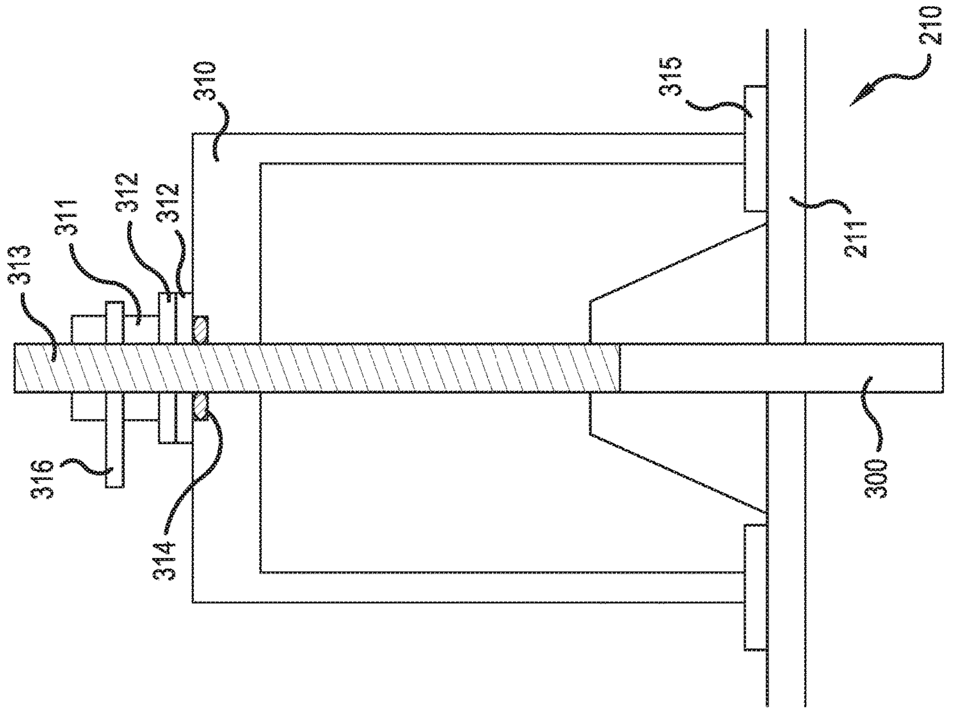
FIG. 6 is a liquid containment device according to another exemplary embodiment.

More specifically, as shown in FIG. 6, according to an exemplary embodiment, the terminal head 300 may be used to directly attach the housing 310 to the tank 210 by fastening a nut 311, washers 312 and/or the like on a threaded head 313 that penetrates through the upper side of the housing 310. The contact of the threaded head 313 and the nut 311, washers 312 and the like may be sealed by sealant 314. The fastening of the nut 311, washers 312 and the like applies the pressing force against the housing 310, and this pressing force provides sufficient sealing by a gasket 315 between the housing 310 and the sidewall 211 of the tank 210 similar to the embodiment discussed earlier. In this exemplary embodiment, a wire connector 316 may be attached to the threaded head 313 of the terminal head 300 to provide an electrical connection with a connecting cable.

In the above-discussed embodiment, if the terminal head 300 does not have enough length to penetrate through the upper side of the housing 310, then an attachment block may be used.

Figure 7:
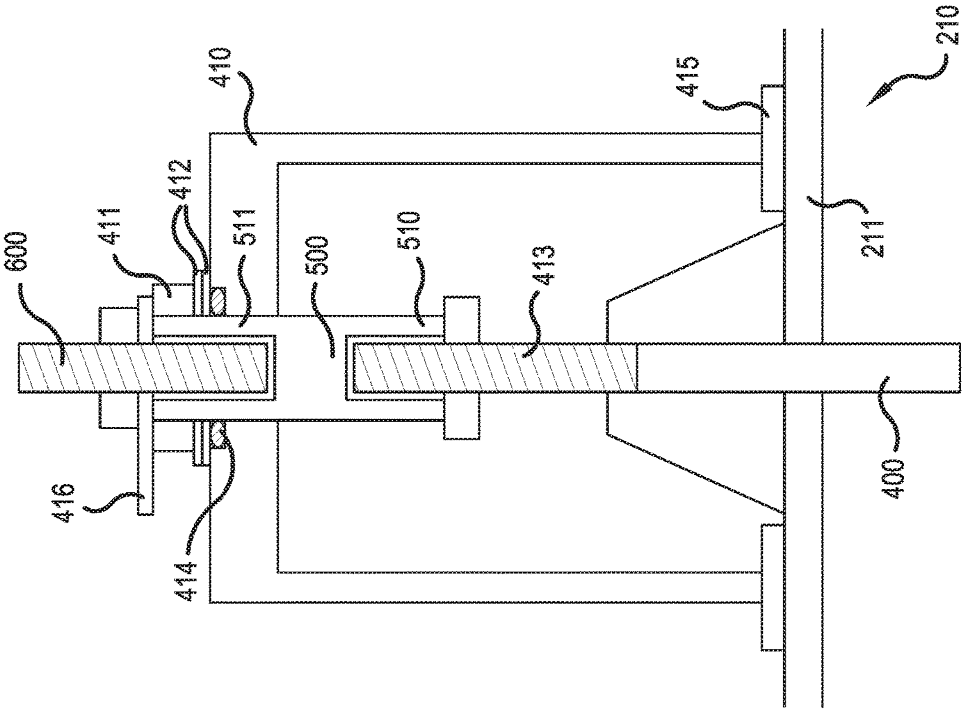
FIG. 7 is a liquid containment device according to yet another exemplary embodiment.

For instance, according to another embodiment shown in FIG. 7, when the threaded head 413 of the terminal head 400 is short, an electrically conductive attachment block 500 may be provided to connect the threaded head 413 to a contact pole 600. That is, the attachment block 500 has a first end 510 and a second end 511. The first end 510 of the attachment block 500 receives the threaded head 413. The second end receives that contact pole 600 that provides means to attach the wire connector 416.

The attachment block 500 penetrates through the upper side of the housing 410 and attached to the housing by fastening a nut 411, washers 412 and/or the like on the attachment block 500. The contact of the attachment block 500 and the nut 311, washers 312 and the like may be sealed by an O-ring 414. Similar to the above-discussed embodiments, the attachment of the nut 411, washers 412 and the like applies the pressing force against the housing 410. This pressing force provides sufficient sealing by a gasket 415 between the housing 410 and the sidewall 211 of the tank 210. A wire connector 416 may be attached to the contact pole 600 to provide an electrical connection with a connecting cable.

The attachment block 500 may be provided entirely within the housing 410. In that case, similar to the exemplary embodiment shown in FIG. 5, the contact pole 600 may be directly fixed on the upper side of the housing 410 in a manner similar to the embodiment shown in FIG. 6.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A liquid containment device for a liquid filled transformer having a tank and a bushing attached to a surface of the tank, the bushing including a terminal having a terminal head and a porcelain bushing, the liquid containment device comprising:
- a terminal head attachment that is attached to the terminal head of the bushing;
- a housing having an open end, a closed end and a contact pole opening formed on the closed end, the housing encapsulating the bushing and the terminal head attachment;
- a contact pole attached to the terminal head attachment and extending through the contact pole opening of the housing;
- a contact attached to the contact pole; and
- a housing fastener that is fastened on the contact pole to press the housing onto the surface of the tank.

2. The liquid containment device according to claim 1, further comprising a gasket provided on the open end of the housing.

3. The liquid containment device according to claim 1, wherein the housing includes a housing body having a second open end, a cover that covers the second open end of the housing body, the cover forming the closed end of the housing, and a seal that seals between the housing body and the cover.

4. The liquid containment device according to claim 1, wherein the housing is made of ceramic, porcelain, alumina, plastic or metal with an insulating sleeve or coating.

5. The liquid containment device according to claim 1, wherein the terminal head attachment includes a first attachment block and a second attachment block that sandwich the terminal head of the bushing in a direction substantially perpendicular to a planar direction of the terminal head.

6. The liquid containment device according to claim 5, wherein the terminal head attachment includes an opening that correspond to a hole on the terminal head, and the liquid containment device further comprises an attachment fastener that is inserted through the opening of the terminal head and the hole formed on the terminal head.

7. The liquid containment device according to claim 1, the housing fastener includes a first fastener that is inserted over the contact pole and fixing the housing on the surface of the tank, and a second fastener that is inserted over the contact pole and disposed above the first fastener and that fixes the contact.

8. The liquid containment device according to claim 1, wherein the contact pole is attached to the terminal head attachment by a fastener, welding or an adhesive.

9. The liquid containment device according to claim 1, wherein the contact pole comprises two contact poles, wherein the terminal head attachment device comprises a first attachment block and a second attachment block each connected to the respective contact poles, and wherein the contact poles are inserted through two contact pole openings on the housing.

10. The liquid containment device according to claim 1, wherein the contact is in an L-shape.

11. The liquid containment device according to claim 1, wherein the contact has a first section having a first contact hole for connecting to an external device and a second section having a second contact hole for being inserted over the contact pole.

12. The liquid containment device according to claim 11, wherein a direction in which the first section of the contact extends from the second section is in parallel with a direction of the terminal head of the bushing that extends from the porcelain bushing.

13. The liquid containment device according to claim 1, wherein the terminal head attachment is made of brass.

14. The liquid containment device according to claim 1, wherein the contact pole is made of copper.

15. The liquid containment device according to claim 1, wherein the housing includes an indented part, and the liquid containment device further includes a contact pole seal that is disposed in the indented part of the housing to seal the contact pole and the housing.

16. The liquid containment device according to claim 1, wherein the bushing is a low voltage bushing.

17. The liquid containment device according to claim 1, wherein the bushing is a high voltage bushing.

18. The liquid containment device according to claim 1, wherein an open end of the housing has a shape corresponding to a shape of the surface of the tank.

19. A liquid containment device for a liquid filled transformer having a tank and a bushing attached to a surface of the tank, the bushing including a terminal having a terminal head and a porcelain bushing, the liquid containment device comprising:

a housing having an open end, a closed end and a terminal head opening formed on the closed end, the housing encapsulating the porcelain bushing and a first part of the terminal head of the terminal, a second part of the terminal head penetrating through the terminal head opening of the housing so as to be exposed outside the housing;

a housing fastener that is fastened on the second part of the terminal head to press the housing onto the surface of the tank; and a contact attached to the second part of the terminal head.

20. A liquid containment device for a liquid filled transformer having a tank and a bushing attached to a surface of the tank, the bushing including a terminal having a terminal head and a porcelain bushing, the liquid containment device comprising:

a terminal head attachment having a first end and a second end, the first end being attached to the terminal head of the bushing;

a housing having an open end, a closed end and an opening formed on the closed end, the housing encapsulating the bushing and at least a first portion of the terminal head attachment;

a contact pole attached to the second end the terminal head attachment; and a contact attached to the contact pole, wherein a second portion of the terminal head attachment or the contact pole penetrates through the opening of the housing so as to be exposed outside the housing, and wherein a housing fastener is fastened on an exposed portion of the terminal head attachment or the contact pole to press the housing onto the surface of the tank.

* * * * *